July 8, 1958 — L. J. DAVIS — 2,842,395
SUN VISOR EXTENSION
Filed Dec. 10, 1956
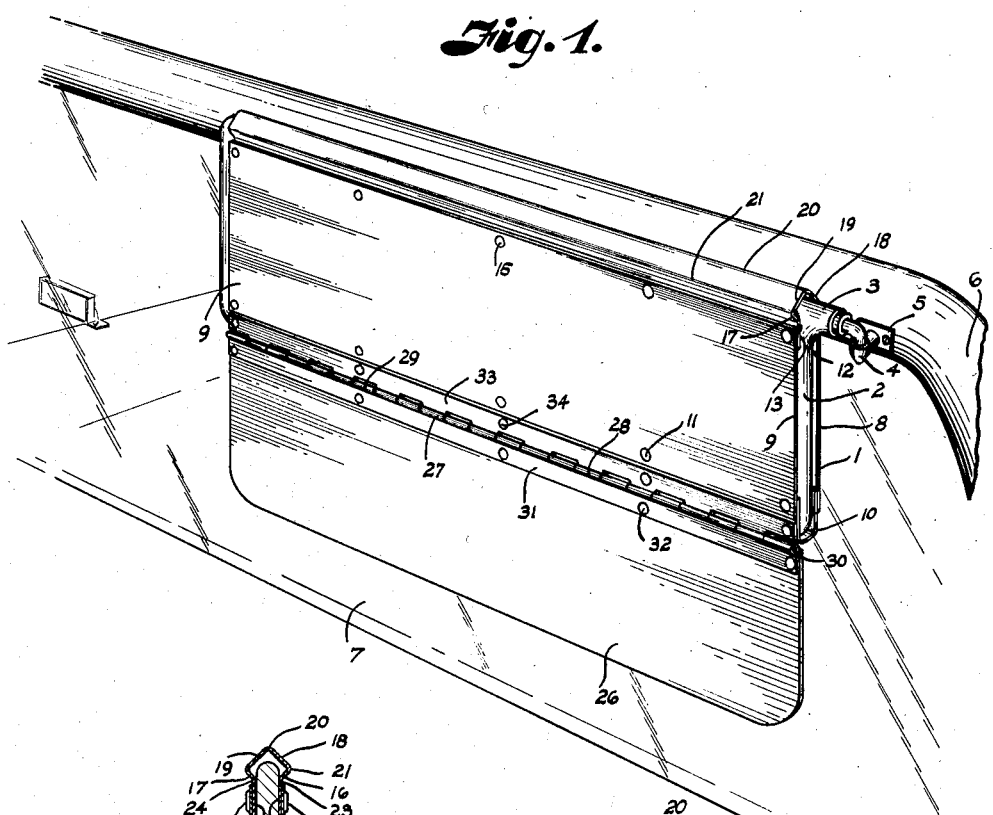
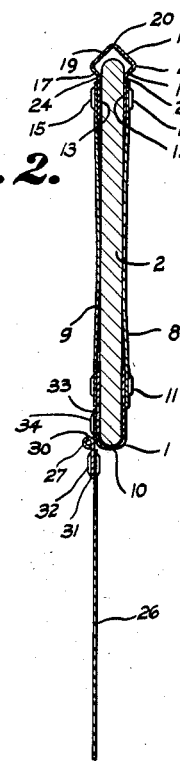
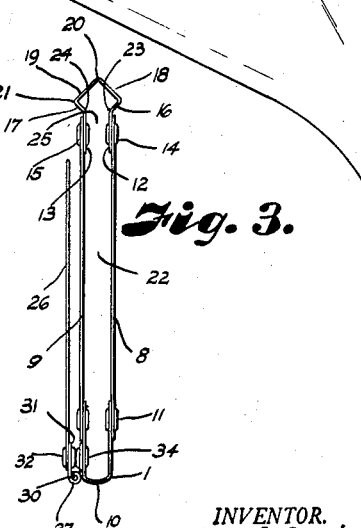
INVENTOR.
Lucile J. Davis.
BY Fishburn & Gold.
ATTORNEYS.

United States Patent Office 2,842,395
Patented July 8, 1958

2,842,395

SUN VISOR EXTENSION

Lucile J. Davis, Wichita, Kans.

Application December 10, 1956, Serial No. 627,232

1 Claim. (Cl. 296—97)

This invention relates to an extension for a sun visor and more particularly to an attachment for enlarging the surface area of said visor longitudinally and vertically.

Various attempts have been made to devise an enlargement or attachment to a sun visor which could be quickly and easily installed or removed from the visor when not in use, but these attempts have not accomplished the real purpose and therefore have been unsuccessful. The modern cars have reduced the glare difficulty to some extent by having colored glass in the windshield and others have visors which are too small to be effective in the late evenings or early mornings due to the narrowness of the body primarily because the manufacturers have believed the larger visor would detract from the appearance of the interior of the automobile.

It is the principal object of the present invention to provide an attachment for a sun visor which may quickly be installed by merely sliding a sleeved body member over the body of the visor and which may be adjusted to a desired place on the visor longitudinally to provide a longer visor, and also to provide a hinged vertical extension to the visor which may be utilized when the sun is low and the driver is facing it to extend the vertical area of the visor and which may be swung out of position to lie alongside the sleeve member of the attachment when not in use.

Other objects of the present invention are to provide an extension secured to one side edge of the sleeve member of the attachment which will lie flat along said side of the sleeve member and will allow the body of the visor to be rotated or swung on its support out of the way against the top of the vehicle and to provide a device of this character simple and economical to manufacture.

In accomplishing these and other objects of my invention, I have provided improved details of structure the preferred forms of which are illustrated in the accompanying drawings, wherein:

Fig. 1 is a perspective view of my attachment shown on the visor with the vertical extension in extended position.

Fig. 2 is a cross-sectional view of the attachment shown on the visor.

Fig. 3 is an end view of the attachment with the extension folded along one side of the attachment.

Referring more in detail to the drawings:

1 designates an attachment embodying the features of my invention adapted to be attached to the frame or body 2 of a visor 3 rotatably and swingably attached to a socket 4 of a bracket 5 of the frame 6 for the windshield 7 of an automobile (not shown).

The attachment 1 has sidewalls 8 and 9 joined together at their lower edges by a U-shaped member 10 by spaced rivets or the like 11. The upper edges of the walls 8 and 9 are joined together by an elongated member having substantially flat sidewalls 12 and 13 secured to the upper edges of the walls 8 and 9 by a plurality of rivets as indicated at 14 and 15. The walls 12 and 13 of the connecting member are extended outwardly at an angle as indicated at 16 and 17 thence inwardly towards each other as indicated at 18 and 19 terminating in a ridge 20 forming a substantially diamond-shaped gripping element as indicated at 21.

The space 22 between the walls 8 and 9 is slightly narrower than the body of the visor 3 and the frame 2 thereof so that when the attachment is sleeved over said visor the walls 8 and 9 will be flexed outwardly slightly and the parallel extending ribs 23 and 24 of the gripping member 21 will exert a pressure of the throat 25 of the sleeve member on the frame of the body of the visor to retain the attachment in any longitudinally adjusted position thereon.

An extension member 26 is provided for the sleeve member of the attachment for extension of the vertical area of the sun visor and it is hingedly secured to the U-shaped member 10 by a hinge 27 which consists of a plurality of spaced bracket members 28 and 29 forming bearings for a removable pin 30. One leaf 31 of the hinge is secured to the extension 26 by rivets or the like 32 and the other leaf 33 is secured to one side of the U-shaped member 10 by rivets or the like 34.

While I have here shown the attachment with its extension to be made of metal it will be obvious that any kind of material may be used such as plastic or other similar material and it will be further obvious that the attachment may be made in various colors as desired to lend to the attractiveness of the device.

To attach the attachment to the sun visor the sleeve member is merely flexed outwardly slightly to insert the left hand end over the right hand end of the visor and the attachment may be inserted over the body of the visor to the desired place for use. It will be obvious that the tension of the sleeve member will hold the attachment in any desired place on the visor. The extension 26 is adapted to lie alongside the side wall 9 of the sleeve member of the attachment when not in use as best illustrated in Fig. 3 or when the attachment is used for longitudinal extension of the visor. When the vertical area of the visor is desired to be enlarged the extension member 26 may be swung on the hinge 27 to the adjusted position desired either in straight alignment with the side wall 9 of the sleeve member as shown in Fig. 2 or at any distance between the position shown in Fig. 3 and the position shown in Fig. 2.

While I have here shown the attachment on the visor at the right of the windshield of the vehicle, it will also fit the visor on the left or driver's side of the vehicle, in which event the attachment is turned end to end so that the extension member 26 is preferably at the back side or the windshield side of the visor so that the flap or extension will turn up and lie alongside of the sleeve member when not in use.

It will be obvious from the foregoing that I have provided an improved attachment for a sun visor for enlarging the area thereof longitudinally and vertically and which may be readily attached to and removed from the visor as desired.

What I claim and desire to secure by Letters Patent is:

An attachment for longitudinal and vertical enlargement of a sun visor for motor vehicles supported from the frame of said vehicle, said visor having a substantially flat rectangular body swingable about said support, said attachment comprising, a pair of side members spaced apart for engaging each side of said visor, a U-shaped member joining the bottom edges of the side members together with the legs of said U-shaped member engaging the inner surfaces of the side members, an elongate member joining the top edges of said side members together and having opposed depending side walls engaging the inner surfaces of said side members, said elongate member extending upwardly and outwardly at an angle and thence inwardly to a point centrally of said side members forming a substantially diamond-shaped gripping member, said sides defining a space narrower than the body of said visor whereby when the side members are inserted over the body of the visor, the outward tension on the side members will cause the depending side walls of the elongate member to exert tension on the upper edge of the body of said visor to retain the same in adjusted position longitudinally of the visor, and an extension member of substantially non-flexible material and of substantially the same size of said attachment, and a hinge having one leg connected to one leg of said U-shaped member and the other leg attached to one edge of said extension, said legs of said hinge being provided with mating brackets for receiving a removable pin for vertical swinging movement thereby enlarging said visor when the extension member is swung down.

References Cited in the file of this patent

UNITED STATES PATENTS

| | | |
|---|---|---|
| 2,185,898 | Mitchell | Jan. 2, 1940 |
| 2,238,981 | Newell | Apr. 22, 1941 |
| 2,257,612 | Lininger | Sept. 30, 1941 |